United States Patent [19]

Busse

[11] 4,449,554
[45] May 22, 1984

[54] UNIVERSAL REMOVABLE INSULATION

[76] Inventor: Richard O. Busse, 12863 Ingersoll Ave., Hugo, Minn. 55038

[21] Appl. No.: 460,906

[22] Filed: Jan. 25, 1983

Related U.S. Application Data

[63] Continuation-in-part of Ser. No. 360,355, Mar. 22, 1982, abandoned.

[51] Int. Cl.$^3$ .................... F16L 59/02; F16K 51/00
[52] U.S. Cl. .................... 138/149; 137/375; 138/156; 138/163; 150/52 R; 285/47
[58] Field of Search ............... 137/375; 138/149, 147, 138/156, 157, 158, 163; 150/52 R; 285/47

[56] References Cited

U.S. PATENT DOCUMENTS

| Re. 28,930 | 8/1976 | Johnson | 138/158 |
|---|---|---|---|
| 1,697,839 | 1/1929 | Goerlich | 181/269 |
| 1,722,676 | 7/1929 | Parker | 285/177 |
| 1,774,732 | 9/1930 | Smith | 138/161 |
| 2,068,180 | 1/1937 | Horsman | 138/128 |
| 2,449,754 | 9/1948 | Seitz | 285/4 |
| 2,592,574 | 4/1952 | Kaiser | 285/133 R |
| 2,717,848 | 9/1955 | Jaye | 138/157 |
| 2,937,662 | 5/1960 | Green | 285/47 |
| 3,030,250 | 4/1962 | Losse | 138/149 |
| 3,044,915 | 7/1962 | Jacobsen | 137/375 |
| 3,244,388 | 4/1966 | Coffman | 248/62 |
| 3,367,358 | 2/1968 | Rentschler | 137/375 |
| 3,537,486 | 11/1970 | Hullhorst | 138/147 |
| 3,556,158 | 1/1971 | Schneider | 138/156 |
| 3,559,694 | 2/1971 | Volberg | 138/149 |
| 3,598,157 | 8/1971 | Farr et al. | 138/157 |
| 3,628,572 | 12/1971 | Shannon | 138/149 |
| 3,724,491 | 4/1973 | Knudsen et al. | 137/375 |
| 3,929,166 | 12/1975 | Westerheid | 138/149 |
| 4,022,248 | 5/1977 | Hepner et al. | 138/149 |
| 4,046,406 | 9/1977 | Press et al. | 285/47 |
| 4,071,043 | 1/1978 | Carlson | 137/375 |
| 4,259,981 | 4/1981 | Busse | 137/375 |

Primary Examiner—William J. Van Balen
Attorney, Agent, or Firm—Lawrence M. Nawrocki

[57] ABSTRACT

A universal insulation (10) is the subject of this patent application. The insulation (10) is bifurcated into two portions (16,18) for application to a fitting in a fluid flow or distribution system. Cut-outs (26) are provided in edges (20, 22) of the portions (16, 18) which, when apertures are formed therein, accommodate portions of a fluid fitting therein. Portions (16, 18) of the insulation (10) can have additional cut-outs (28) formed wholly within one of the portions (16, 18). These cut-outs (28) can accommodte portions of a fitting extending generally transverse to a plane defined by other portions of the fitting. Novel means can be employed for maintaining the portions (16, 18) in a mated configuration.

17 Claims, 9 Drawing Figures

UNIVERSAL REMOVABLE INSULATION

CROSS-REFERENCE TO RELATED APPLICATION

This application is a continuation-in-part of applicant's co-pending application Ser. No. 360,355 filed Mar. 22, 1982, now abandoned.

TECHNICAL FIELD

The invention of the present patent application is related broadly to the field of energy conservation. More narrowly, the invention is directed to the field of insulation as used in various hot and cold fluid flow systems. The invention specifically deals with removable insulations which can be applied to any number of fittings in the fluid flow system to insulate the particular fitting from gain or loss of heat as the particular application may dictate.

BACKGROUND OF THE INVENTION

Various types of systems utilize fluids which are maintained at a temperature either above or below ambient temperature. Illustrative of systems wherein the temperature is maintained above ambient temperatures are steam systems used in factories and industrial institutions for heating, cooking, and other purposes.

Similarly, such concerns also utilize systems wherein fluid must be maintained at a temperature below ambient temperature. Typical of this type of system are refrigeration and air conditioning systems.

Because of the energy requirements involved in reducing the temperature of the fluid to a desired level in refrigeration systems and in raising the temperature of the fluid to a desired level in heating systems, it is desirable that heat gain and heat loss, respectively, by the fluid be minimized. This is particularly true in view of the ever escalating costs of energy.

Regardless of the temperature of the fluid carried, these fluid flow systems typically include pipe conduits and various types of fittings interposed in the conduit lines. Fittings which might be interposed to the lines include valves, orifices, L's, and T's. This listing is by no means, however, exhaustive. Various other types of fittings are specifically applicable for use in only systems wherein the fluid is maintained at a temperature either above or below ambient temperature. Steam traps are one type of fitting which might be used in only hot fluid systems.

Because thermal energy transfer might occur either along the pipe lines or through the fittings, it is desirable that both be insulated. Various types of insulation have been designed to insulate the conduit lines. Illustrative of one method of insulation is one in which a fire retardant heat insulative material is wrapped around the pipe and a paste, mixed specifically for the purpose of providing a hardening shell, applied thereto. This method is known as "lagging."

Conducting lagging operations is particularly messy and difficult to clean up. More importantly, however, it is very unsuited for insulation for the various fittings. This is true for a number of reasons. First, while the pipe conduits are generally circularly cylindrical and extend uniformly in an axial direction, valve bodies and other similar fittings have very irregular surfaces. Consequently, it is difficult to apply a sheet material without bunching occuring. Second, frequently, in the case of fittings, moving parts, such as valve stems, are present which might become clogged and inoperative if a paste were to be applied.

Because of these influencing factors, keeping in mind the need to insulate the total fluid flow system, the use of various custom designed insulations has been initiated. Such custom designed structures, however, can, in some cases, be quite expensive.

It is to these problems in the prior art that the invention of the present application is directed. It is an insulation apparatus which can be applied to virtually any fitting which can be interposed in a fluid flow line. Because of its unique structure, it can accommodate the irregular surfaces of the various fittings.

SUMMARY OF THE INVENTION

The invention of the present application is an insulation apparatus for minimizing thermal heat transfer from and to fluid conduit fittings through which hot and cold fluids, respectively, pass. The apparatus includes a shell which is split into two portions along a plane. Two engagable edges are, thereby, defined. A plurality of defined cut-out panels are formed in the shell, a portion of each of the cut-outs being in each of the edges of the complimentary portions of the shell. The cut-outs are positioned at various locations about the engageable edges so that angularly spaced portions of a fitting can pass through different of the cut-outs when the two portions are brought together about the fitting.

Additionally, each portion of the shell can have at least one additional cut-out panel formed completely therein. These cut-out panels can, when removed in an appropriate manner, provide access for portions of a fitting which extend normal to a plane defined by other portions of the same fitting passing through the cut-outs formed in the edges of the shell portions. A fitting having portions extending in three dimensions from the fitting body can, therefore, be accommodated by the insulation apparatus.

The cut-outs can have indicia marked thereon to indicate the various sizes of pipes with which different fittings which might be accommodated might be used. Typically, such pipes are circularly cylindrical and have a known diameter. The indicia can correspond to various standard sized diameters used in industrial applications. The indicia marked on the cut-out panels would, therefore, be circular, concentric rings. One preferred structure incorporates a panel which is stepped in a direction axially relative to the axis of elongation of the fitting portion. In order to accommodate the fitting portion, therefore, the panel need only be cut at the base of one of the steps, i.e., the step having a diameter similar to that of the piping with which the fitting is used. The two shell portions can, thereafter, be closed over the fitting with the pipe being received in the aperture cut out of the cut-out panel.

A second embodiment of the cut-out can be substantially planar in configuration, but with a plurality of generally circular beads formed on an outwardly facing side thereof. Each bead can define both a radially inward and radially outward annular shoulder against which a cutting instrument can be brought to bear in cutting through the cut-out panel in order to form an aperture of a predetermined, desired size.

A third embodiment of the cut-out comprises a generally conically shaped wall which narrows outwardly along an axis with respect to which the wall is aligned.

In order to form apertures of varying sizes, the wall can be cut through along a plane generally normal to the axis and at spaced locations along the axis.

Depending upon the particular application, the shell can be formed of different materials. In a cold fluid system, the shell portions would typically be made of either a polystyrene plastic or a urethane material and would be relative thick. In a hot fluid system, the shell portions would typically be made of an acrylonitrile-butadiene-styrene resin or polyvinyl chloride. In a hot fluid system application, the shell portions might be relatively thin and carry therein removable fibrous insulative material inserts. Such inserts might be made of fiberglass or other appropriate insulative material. Such inserts could be made oversized so that threads thereof would extend through apertures cut into the cut-out panels and merge with insulative materials surrounding the pipes to which the fitting is attached. A complete insulative seal can, thereby, be achieved.

The invention of this application is, thus, an improved, universal insulation apparatus for use with fluid systems and fittings of various construction. More specific advantages will become apparent with reference to the detailed description of the invention, claims, and appended drawings.

DETAILED DESCRIPTION OF THE INVENTION

Figure 1:
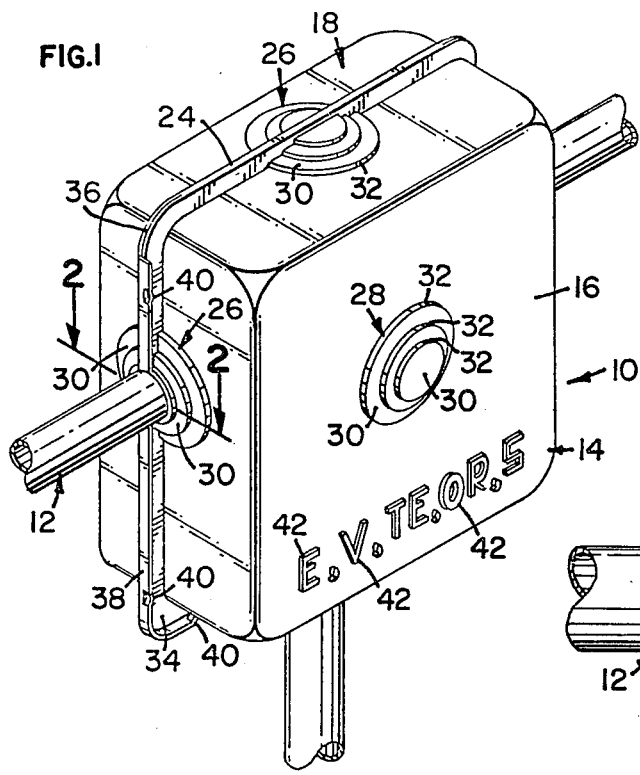
FIG. 1 is a view in perspective showing an insulation in accordance with the present invention as attached to a T fitting in a fluid system.
Figure 2:
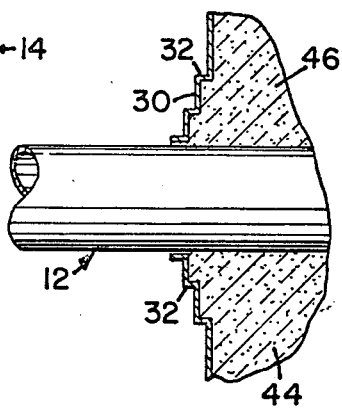
FIG. 2 is an enlarge view taken generally along the line 2—2 of FIG. 1.

Referring now to the drawings wherein like reference numerals denote like elements throughout the several views, FIG. 1 illustrates a universal insulation 10 in accordance with the invention of the present application. As seen in that figure, the insulation 10, which is removable so that it can be reused under other circumstances, is shown as being mounted to a tee fitting 12 which might typically be used in a steam distribution system. It will be understood that although a tee fitting 12 is illustrated as being insulated by the invention, various other types of fittings can be encased thereby. Because of the structure of the insulation 10, it can be affixed to virtually any type of fitting which might be positioned in either a hot or cold fluid distribution and control system. In this respect, the system is universal.

Figure 3:
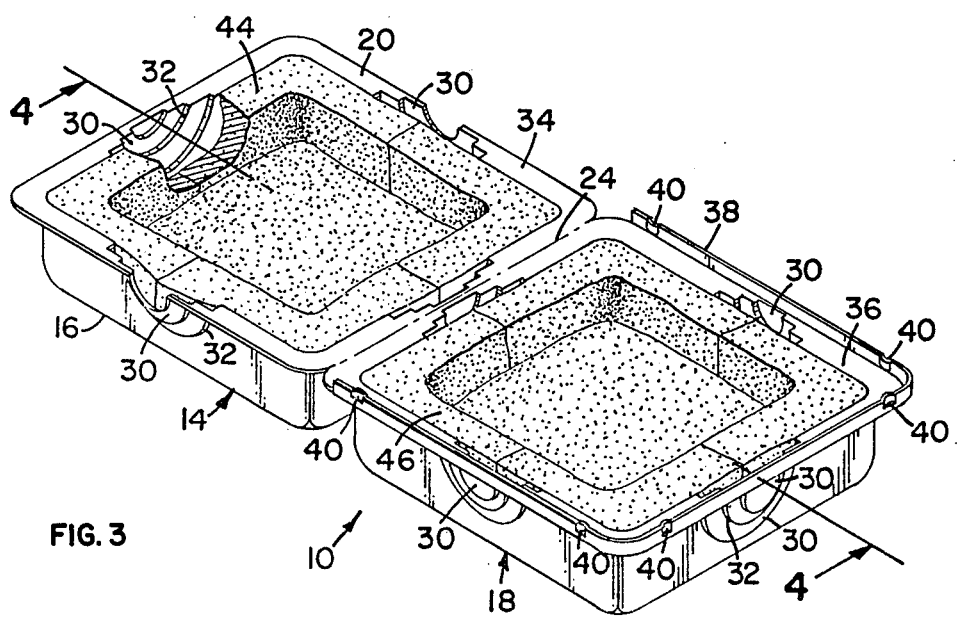
FIG. 3 is a perspective view showing the insulation of FIG. 1 in an opened position.
Figure 4:
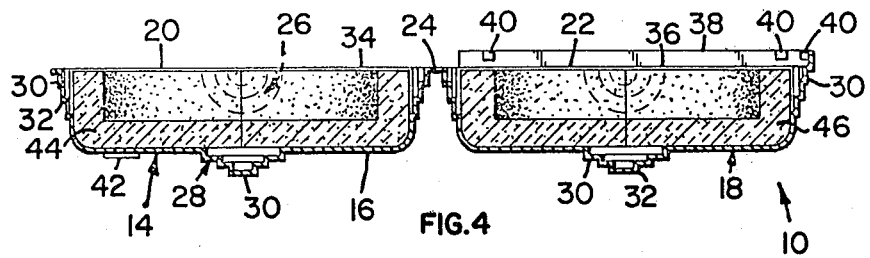
FIG. 4 is a view taken generally along the line 4—4 of FIG. 3.
Figure 5:
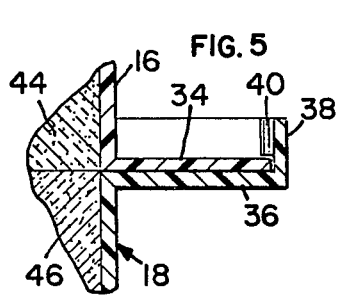
FIG. 5 is an enlarged view illustrating structure for holding one shell portion to the other and for precluding the entry of liquids into the insulative structure.

The insulation of the present invention includes a shell 14 which is bifurcated to define two portions 16, 18. Although not essential to the invention, the drawings, and particularly FIGS. 3 and 4, illustrate the shell 14 as being bifurcated into two portions 16, 18 of equal size. The shell 14 is bifurcated along a plane to define two edges 20, 22 which are engagable when the portions 16, 18 of the shell 14 are mated to insulate a fitting.

Throughout the various figures, the bifurcated portions 16, 18 are shown as being hinged as at 24 so that the insulation 10 is integrally formed. It will be understood, however, that it is equally within the scope of the invention to provide two bifurcated portions 16, 18 which are separate from one another.

The drawings illustrate the insulation 10, when encasing a fitting, as being polyhedral. Specifically, the insulation 10 is illustrated as being quadralateral in cross-section. Cut-out panels 26, 28 formed in the insulation 10 can, thereby, accommodate portions of fittings which, in most cases extend generally perpendicular to one another.

Cut-out portions 26 are shown as being formed in the matable edges 20, 22, one cut-out panel 26 being formed in each of the four sides along which the portions 16, 18 are mated. The panels 26 are formed so that a portion of each is disposed in each of the two bifurcated portions 16, 18 of the shell 14. That is, each of the four cut-out panels 26 intersects the mated edges 20, 22. As shown in the figures, the four cut-out panels 26 which intersect the mated edges 20, 22 are disposed in planes perpendicular to the planes of adjacent cut-out panels 26.

Additionally, each shell portion 16, 18 can have a cut out panel 28 wholly formed therein, and disposed in a plane generally parallel to the plane defined by the mated edges 20, 22. The insulation 10 can, thereby, accommodate a fitting having portions extending in a direction generally perpendicular to a plane defined by other portions of the fitting. To illustrate, if a fitting has an inlet conduit coming into a main body portion thereof and a primary outlet conduit exiting from the main body portion at ninety degrees to the inlet portion, said conduits can be accommodated by apertures formed in the insulation 10 by cutting out portions of the cut-out panels 26 formed in the matable edges 20, 22 thereof. If, however, the conduit should have another portion, such as a secondary outlet conduit, extending from the main body portion generally perpendicular to a plane defined by the inlet conduit and the primary outlet conduit, an aperture can be formed in a cut-out panel 28 provided wholly within one of the bifurcated portions 16, 18 of the shell 14.

In most embodiments of the invention, the cut-out panels 26, 28 would be circular since most piping used with the type of fittings discussed herein are circularly cylindrical. The cut-out panels 26, 28 can be defined in any appropriate manner. This can include merely marking circular indicia on the shell 14 at appropriate locations to indicate where apertures should be made. The shell 14 can be given a reduced strength at the locations where the apertures are to be cut in order to facilitate the provision of the apertures.

In a preferred embodiment, the indicia representing the various circumferences of pipes with which the fitting is used can comprise stepped platforms 30 concentrically formed in the shell 14. The platforms 30 are stepped axially with respect to the intended direction of extension of the portion of a fitting which is to be disposed within the particular cut out aperture. As in the case of mere markings on the shell 14, these stepped panels 30 can be provided with reduced strength at the circular shoulders 32 defined thereby so that the apertures can be more readily formed.

Figure 6:
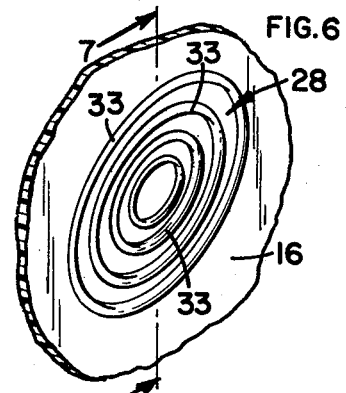
FIG. 6 is a perspective view showing a first alternative embodiment of the cut-out panel.
Figure 7:
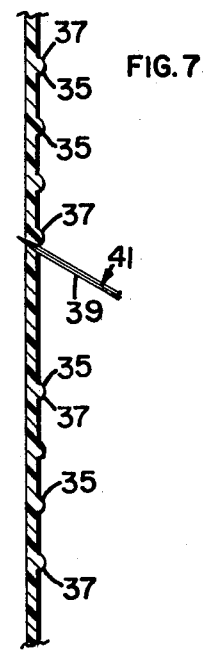
FIG. 7 is a view taken generally along the line 7—7 of FIG. 6.

Referring now to FIGS. 6 and 7, a first alternative embodiment for either of cut-out panels 26, 28 is illustrated. Rather than having stepped platforms 30, this embodiment utilizes a plurality of generally circular, concentric beads 33 formed in, for example, the outer surface of one of the shell portions 16. Each bead 33 defines radially inward and radially outward annular shoulders 35, 37. When an aperture needs to be cut in one of the cut-out panels (28, for example), the blade 39 of a cutting instrument 41 can be brought into engagement with either the inward or outward shoulder 35, 37 of a bead 33 defining a diameter sized similarly to the conduit or fitting portion to be passed through the aperture. The aperture can, thereby, be easily cut to the desired size.

Figure 8:
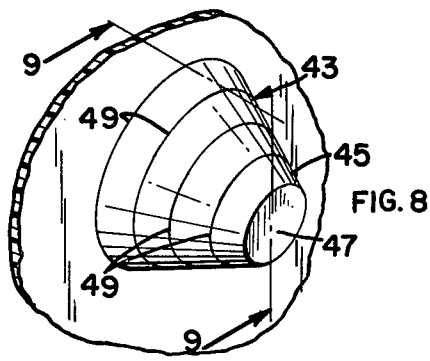
FIG. 8 is a view in perspective showing a second alternative embodiment of the cut-out panel.
Figure 9:
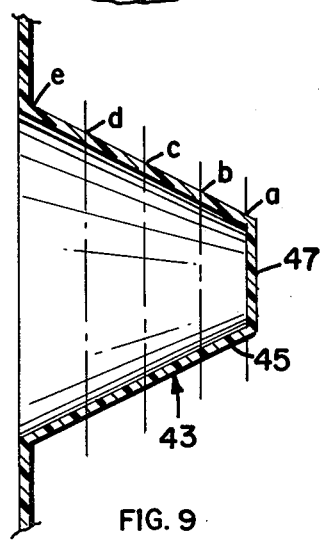
FIG. 9 is a view taken generally along the line 9—9 of FIG. 8.

FIGS. 8 and 9 illustrate a second alternative embodiment for the cut-out (28, for example). The cut-out is defined by a generally conically shaped wall 43. The wall 43 extends along, and is aligned with, an axis (not shown) positioned substantially normal to the surface of the insulation 10 through which a conduit or fitting portion is to extend. The wall 43 narrows outwardly along this axis in a direction away from the insulation 10. As seen in FIGS. 8 and 9, the wall 43 can be closed at its end 45 remote from the insulation 10 by a planar panel 47. It will be understood, however, that the wall 43 can extend outwardly to terminate in a point.

With this configuration, a cutting instrument can cut through the wall 43 at various locations, and the size of the aperture thereby formed will vary depending upon the axial location at which incision is made. For example, if a cut is made through wall 43 along plane a, the aperture formed will be relatively small, and will have a diameter substantially the same as closing panel 47. If wall 43 is truncated along planes spaced closer to insulation 10 (for example, b, c, and d), the aperture thereby formed will be commensurately larger as can be seen with reference to FIG. 9. If a cut is made through wall 43 at the base thereof along plane e, the aperture formed will be substantially the same as the size of the base of the conically shaped wall 43. Wall 43 can be marked with indicia 49 to indicate where cuts should be made in order to achieve apertures of various standard sizes.

When an insulation 10 in accordance with the present invention is mounted to a fitting, it is desirable that condensation or other liquid which might be present in the environment surrounding the fitting not be permitted to seep into the insulation. Such contamination can be, at best, precluded, and, at worst, inhibited by providing a liquid seal at the intersection of the mated edges. Each bifurcated portion 16, 18 of the shell 14 can be provided with a flange 34, 36 which extends outwardly away from the fitting when the insulation 10 encases the fitting. Each flange 34, 36 can define a plane so that the planes, thereby defined, are parallel, with faces of the flanges 34, 36 in engagement when the portions 16, 18 are mated. One of the flanges 36 can be provided, at its extremity remote from the portion 18 of the shell 14 to which it is attached, with a liquid entry shield 38. The shield 38 can be made to extend generally normal to the flange 36 along its length. If the flanges 34, 36 are essentially of the same size, the one not provided with a shield 38 will fit closely within the shield 38 of the other flange 36. The shield 38 can, therefore, be provided with a plurality of nubs 40 extending inwardly from the shield 38. The nubs 40 can be resilient in nature so that, when the two portions 16, 18 of the shell 14 are brought into mating engagement, they will deform to allow the opposite flange 34 to engage the flange 36 carrying the shield 38. After passage of this flange 34, therefore, nubs 40 will snap out to retain the flanges 34, 36 in engagement.

As seen in the figures, the shield 38 is provided only about three sides of the edge 22 of one of the portions 18. This is so since the embodiment illustrated in the figures is one wherein the portions 16, 18 are hinged along a fourth side. In such an embodiment, of course, shielding would not be necessary along the fourth side since a seal naturally exists there. In embodiments wherein the shell portions 16, 18 are separable pieces, the shield 38 would, appropriately, be provided completely about the edge of one of the portions.

It will be understood that the method for mating the shell portions 16, 18 need not be as described hereinbefore. Rather, any appropriate mating means might be utilized to hold the portions 16, 18 together.

As previously indicated, the insulation 10 of the present application can be used with enumerable types of fittings. They include steam traps, strainers, valves, tee connectors, elbows, orifices, etc. Once applied to the particular fitting, it is often difficult to determine from visual inspection, the type of fitting thereby insulated. Yet, it remains important to know what type of fitting is located at a particular location in the system. This can be accomplished by making records which can be maintained for subsequent use in ascertaining the type of fitting insulated in a particular location. The shell 14 of the present insulation can, however, be provided with indicia 42 representative of the various types of fittings which might be insulated. The indicia 42 might use, for example, an "E" to indicate an elbow, a "V" to indicate a valve, "TE" to indicate a tee fitting, "OR" to indicate an orifice, and "S" to indicate a strainer. These indicia 42 are, of course, not all inclusive, and other indicia can be devised to represent any type of fitting which might be encountered. When a person applying the insulation 10 to the fitting has completed the installation, he need merely indicate in an appropriate manner the type of fitting which has been insulated. He can do this by either x-ing out the appropriate indicia 42 representing the fitting insulated or by circling the appropriate indicia 42.

Depending upon the particular application—that is, whether used in a hot or cold fluid system—the shell 14 may be made of different materials. In cold system applications, it has been found appropriate to manufacture the shell 14 from either a polystyrene plastic or urethane material. When such materials are used, the rigidity of the material would preclude the shell 14 from conforming to the shape of the fitting insulated. The shell 14 would, therefore, provide all the insulative capacity for the structure.

In hot fluid system applications, the shell 14 would appropriately be formed of either polyvinyl chloride or acrylonitrile-butadiene-sytrene resin. When such materials are used to form the shell 14, most of the insulative capacity of the insulation structure would be provided by a pair of fiberglass or other fibrous material inserts 44, 46. One of the inserts 44, 46 would be seated in each of the shell portions 16, 18. The inserts 44, 46 would be removable so that if the fibrous material deteriorated over a period of time, they could be replaced. Similarly, if a particular shell 14 was to be used in a scenario requiring a higher insulative capacity, one insert could be exchanged for another having better characteristics for the particular scenario.

The inserts 44, 46 would typically be somewhat amorphous in nature so that they would conform to the contours of the fitting and be in engagement with the fitting body. The inserts 44, 46 can be made somewhat oversized so that they would tend to protrude through the apertures formed in the cut-out portions 26, 28 of the shell 14 and merge with insulative material surrounding pipes to which the fitting is attached. Maximum insulative capacity can, thereby, be achieved.

Numerous characteristics and advantages of the invention for which this application has been submitted have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A removable, reusable insulation for insulating various hot and cold fluid conduit fittings, comprising a shell bifurcated along a plane to define a pair of engagable edges and having a plurality of defined cut-outs formed therein with a portion of each of said cut-outs formed in each of said edges, said cut-outs being positioned relative to one another so that angularly spaced portions of a fitting can pass through different of said cut-outs.

2. An insulation in accordance with claim 1 wherein said insulation further includes cut-outs formed therein to accommodate portions of a fitting insulated thereby which extend normal to a plane defined by portions of the fitting passing through said cut-outs formed in said edges.

3. An insulation in accordance with claim 2 wherein each of said cut-outs has marked thereon a plurality of circular, concentric indicia representing different diameters to which said cut-outs can be cut depending upon the size of the angularly spaced portion of the fitting which is to be passed therethrough.

4. An insulation in accordance with claim 3 wherein said cut-outs extend generally radially with respect to axes of elongation of the respective portions of fittings accommodated thereby, and wherein said concentric indicia comprise platforms stepped axially relative to the portions of the respective fittings when the portions are disposed in said cut-outs.

5. An insulation in accordance with claim 3 wherein said concentric indicia comprise a plurality of circularly formed, beaded protrusions providing annular shoulders against which a cutting instrument can be engaged to cut through the cut-outs to one of a corresponding plurality of predetermined diameters.

6. An insulation in accordance with claim 1 wherein said shell is formed from a polystyrene plastic for insulation of cold fluid conduit fittings.

7. An insulation in accordance with claim 1 wherein said shell is formed from a urethane material for insulation for cold fluid conduit fittings.

8. An insulation in accordance with claim 1 wherein said shell is formed from an acrylonitrile-butadiene-styrene resin.

9. An insulation in accordance with claim 1 wherein said shell is formed from polyvinyl chloride.

10. An insulation in accordance with claim 1 further comprising a pair of fiberglass insulation inserts, each insert being seatable in one of said bifurcated shell portions to completely encase a fitting.

11. An insulation in accordance with claim 10 wherein said inserts are oversized to extend through apertures formed when at least portions of said cut-outs are removed, and to merge with insulative material surrounding pipes to which the fitting encased between the shell portions is attached.

12. An insulation in accordance with claim 1 further comprising indicia, representative of various fittings which can be encased between said shell portions, formed on said shell, whereby, when a particular fitting is encased between said shell portions, said indicia can be marked appropriately to indicate the type of fitting thereby insulated.

13. An insulating shell having at least one location at which fluid flow conduits and fluid flow fitting portions can pass through said shell, said at least one location being defined by, and comprising, a generally conically shaped wall, narrowing outwardly along an axis with which said wall is aligned, wherein said wall can be truncated at various positions along said axis to form apertures of various size depending upon the position of truncation, through which apertures conduits and fitting portions can be made to pass.

14. Apparatus for insulating various fittings interposed in a system for controlling flow of a fluid heated above ambient conditions, comprising:
  (a) first and second shell portions, each having an edge defining a plane and being matable with the other of said portions along said edges, said shell portions, when mated, having a plurality of cut-out panels intersecting said mated edges formed therein, said panels being spaced about said mated edges; and
  (b) a pair of fibrous insulative material inserts, one of said inserts being removably positionable in each of said shell portions to conform to an outer surface of a fitting encased therein when said shell portions enclose said fitting.

15. Apparatus in accordance with claim 14 wherein said edges comprise facing, parallel flanges engagable to mate said shell portions together, said apparatus further comprising means for releasably holding said flanges in engagement.

16. Apparatus in accordance with claim 15 further comprising a liquid entry shield attached to one of said flanges at the extremity thereof and extending normal thereto in a direction, when said shell portions are mated, toward the opposite of said flanges.

17. Apparatus in accordance with claim 16 wherein said holding means comprises a plurality of resilient nubs carried by said shield and extending from said shield inwardly toward said shell portions, wherein, as said portions approach one another during mating, said nubs snap over the flange carried by said shell portion opposite that to which said shield is attached.

* * * * *